United States Patent
Lazar, II et al.

(10) Patent No.: US 9,944,134 B2
(45) Date of Patent: Apr. 17, 2018

(54) INTEGRATED SENSING UNIT AND METHOD FOR DETERMINING VEHICLE WHEEL SPEED AND TIRE PRESSURE

(71) Applicant: GM GLOBAL TECHNOLOGY OPERATIONS LLC, Detroit, MI (US)

(72) Inventors: Walter M. Lazar, II, Howell, MI (US); John A. Jacobs, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 310 days.

(21) Appl. No.: 14/748,624

(22) Filed: Jun. 24, 2015

(65) Prior Publication Data
US 2016/0375732 A1    Dec. 29, 2016

(51) Int. Cl.
*B60C 23/04* (2006.01)
*G01P 7/00* (2006.01)

(52) U.S. Cl.
CPC ...... *B60C 23/0481* (2013.01); *B60C 23/0488* (2013.01); *G01P 7/00* (2013.01); *B60T 2220/04* (2013.01)

(58) Field of Classification Search
CPC .................................................. B60C 23/0481
USPC ....................................................... 73/115.08
See application file for complete search history.

(56) References Cited

U.S. PATENT DOCUMENTS

| 2005/0235744 A1* | 10/2005 | Ogawa | B60C 23/001 73/146 |
| 2006/0049923 A1* | 3/2006 | Miyazaki | B60C 23/0408 340/426.33 |
| 2009/0205401 A1* | 8/2009 | Munko | B60T 8/172 73/1.37 |
| 2010/0141416 A1 | 6/2010 | Kukshya et al. | |

FOREIGN PATENT DOCUMENTS

CN    101480904 A    7/2009

OTHER PUBLICATIONS

Krstic, Savic, Kraemer, Junghans; Applying Tire Pressure Monitoring Devices for Traffic Management Purposes; International Symposium on Signals, Systems, and Electronics (ISSSE); Oct. 2012; 6 pages.
Pedley; Mark, Tilt Sensing Using a Three-Axis Accelerometer, Freescale Semiconductor Application Note, Mar. 2013, document No. AN3461, Rev. 6, 22 pages.
Lohndorf, Kvisteroy, Westby, Halvorsen; Evaluation of Energy Harvesting Concepts for Tire Pressure Monitoring Systems; PowerMEMS Technical Digest; 2007; 4 pages.

* cited by examiner

*Primary Examiner* — Walter L Lindsay, Jr.
*Assistant Examiner* — Philip Marcus T Fadul
(74) *Attorney, Agent, or Firm* — Reising Ethington, P.C.

(57) ABSTRACT

An integrated sensing unit and method that involves wirelessly transmitting tire pressure sensor readings and wheel speed readings to a control module in a vehicle. Sensor circuitry for a tire pressure monitoring (TPM) system can be (Continued)

used with an inertial measurement unit (IMU) in an integrated sensing unit to facilitate the wireless transmittance of wheel speed data. In an exemplary embodiment, the wheel speed data from the integrated sensing unit provides a redundant measure of wheel speed that can prolong the availability of vehicle systems that rely upon wheel speed, despite a potential malfunction of one or more typical wheel speed sensors.

17 Claims, 2 Drawing Sheets

INTEGRATED SENSING UNIT AND METHOD FOR DETERMINING VEHICLE WHEEL SPEED AND TIRE PRESSURE

FIELD

The present invention generally relates to determining vehicle wheel speed, and more particularly, to an integrated sensing unit mounted on the vehicle wheel that combines a tire pressure monitoring (TPM) system and an inertial measurement unit (IMU) for determining wheel speed.

BACKGROUND

A multitude of vehicle systems rely upon an accurate determination of vehicle wheel speed for proper operation. Autonomous driving systems, for example, oftentimes use redundant wheel speed readings to verify that the determined wheel speed is an accurate representation of the actual wheel speed. However, the introduction of additional wheel speed sensors that rely upon their own circuitry, wiring, and transmitting mechanisms can add cost and unnecessary complexity to existing vehicle systems. Accordingly, by integrating an IMU into an already existing vehicle system, such as a TPM system, it may be possible to reduce cost and system complexity, yet still provide a redundant source of wheel speed readings.

TPM systems have become a standard feature in many vehicles, and in the United States, the Transportation Recall Enhancement Accountability and Documentation Act (also known as the TREAD Act) mandates that most new vehicles under 10,000 pounds of gross vehicle weight be equipped with a TPM system that can alert a driver when the pressure in one of the tires falls below a certain level. Conventional TPM systems include a pressure sensor, a processor, and a transmitter or transceiver for wirelessly transmitting pressure information to other systems or modules elsewhere on the vehicle. Integrating an IMU with a conventional TPM system allows for wheel speed data to be transmitted to other vehicle systems and modules utilizing much of the pre-existing hardware and wireless hardware that is already in place for proper functioning of the TPM system.

SUMMARY

According to one embodiment, there is provided a method for determining vehicle wheel speed with an integrated sensing unit. The integrated sensing unit is mounted on the vehicle wheel and includes a pressure sensor, an inertial measurement unit (IMU), a processor, and an antenna. The method comprises the steps of gathering rotational wheel speed sensor readings from the IMU of the integrated sensing unit, using one or more rotational wheel speed sensor readings from the IMU of the integrated sensing unit to determine an integrated sensor wheel speed value, and wirelessly transmitting the integrated sensor wheel speed value to a control module via the antenna of the integrated sensor unit.

According to another embodiment, there is provided a method of corroborating data from one or more vehicle wheel speed sensors with an integrated sensing unit. The integrated sensing unit is mounted on the vehicle wheel and includes a pressure sensor, an inertial measurement unit (IMU), a processor, and an antenna. The method comprises the steps of gathering rotational wheel speed sensor readings from the IMU of the integrated sensing unit, using one or more rotational wheel speed sensor readings from the IMU of the integrated sensing unit to determine an integrated sensor wheel speed value, and performing intrawheel corroboration with the integrated sensing unit that rotates in the vehicle wheel. Intrawheel corroboration verifies the validity of wheel speed data from a stationary, first wheel speed sensor.

According to another embodiment, there is provided an integrated sensing unit comprising a valve stem, an inertial measurement unit (IMU) for providing rotational wheel speed readings, a pressure sensor for providing tire pressure sensor readings, and sensor circuitry for the IMU and the pressure sensor. The sensor circuitry includes memory, a processing unit, and a wireless unit for transmitting an integrated sensor wheel speed value to a control module of a vehicle. The integrated sensor wheel speed value is obtained from one or more rotational wheel speed readings provided by the IMU. The integrated sensing unit is mounted within a vehicle wheel.

DRAWINGS

Preferred exemplary embodiments will hereinafter be described in conjunction with the appended drawings, wherein like designations denote like elements, and wherein.

DESCRIPTION

The integrated sensing system and method described herein may be used to provide wheel speed and tire pressure readings, and more particularly, can provide redundancy for wheel speed sensors that are already part of an existing vehicle system. The integrated sensing system and method take advantage of an integrated sensing unit that includes a tire pressure sensor and an IMU that are mounted together on the vehicle wheel and wirelessly communicate with the rest of the system. By integrating an IMU with an existing vehicle TPM system, costs and system complexity may be reduced because the IMU can exploit some of the TPM system functionality.

Figure 1:
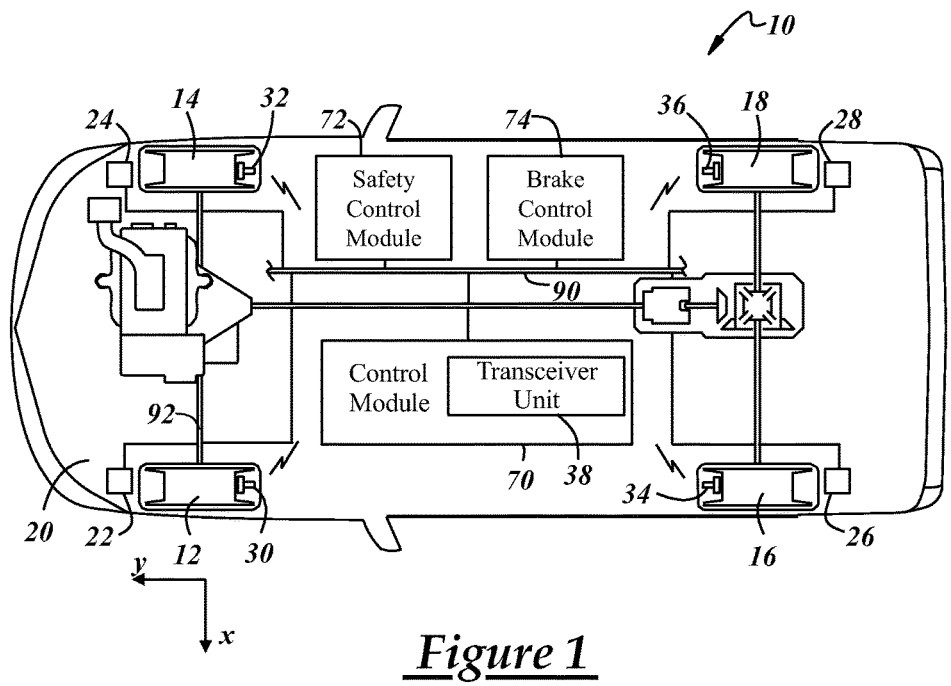
FIG. 1 is a schematic view of an integrated sensing system that is mounted on a vehicle and includes four integrated sensing units located at each wheel, respectively, and a transceiver unit.

Conventionally, wheel speed is determined using wheel speed sensors that are stationarily mounted on the vehicle and evaluate a nearby rotating wheel, such as wheel speed sensors 22-28 depicted in FIG. 1. In the illustrated embodiment, individual wheel speed sensors 22-28 are operably coupled to each of the vehicle's four wheels 12-18 and separately provide speed signals to a brake control module or the like via a wired connection. Skilled artisans will appreciate that these sensors may operate according to optical, electromagnetic or other technologies, and that speed sensors 22-28 are not limited to any particular speed sensor type. In another embodiment, speed sensors are only coupled to two wheels, or they could alternatively be coupled to certain parts of the vehicle, such as an output shaft of the transmission or behind the speedometer, and produce speed signals from these measurements. Wheel speed sensors 22-28 may also determine vehicle speed relative to the ground by directing radar, laser and/or other signals towards the ground and analyzing the reflected signals, or by employing feedback from a navigation unit that has Global Positioning System (GPS) capabilities. The particular type, number, or arrangement of speed sensors is not limited to that shown in FIG. 1. Moreover, the integrated sensing system and method described herein could obviate the need for conventional wheel speed sensors in some instances. It should be noted that wheel speed sensors 22-28 are not mounted or located within the rotating wheel, but are typically mounted on or near one of the non-rotating components of the corner, such as the brake calipers.

In accordance with the embodiment depicted in FIG. 1, the integrated sensing system 10 includes integrated sensing units 30-36 that are respectively mounted within the vehicle wheels 12-18 and are designed to take readings such as tire pressure readings and rotational wheel speed readings and wirelessly communicate those readings to transceiver unit 38, which is mounted on the vehicle 20. In a preferred embodiment, each integrated sensing unit 30-36 is used to replace a traditional rubber valve stem and includes a pressure sensor 50, an IMU 52, sensor circuitry 54, an antenna 56, and a power source 58. Although the following description is in the context of a particular integrated sensing system 10, it should be appreciated that this system is merely exemplary and that the system may be altered or adapted based on the requisites of the particular vehicle. It should be appreciated that any number of additional components, devices, sensors, circuits, etc. that are known in the art could also be used. Further, although the following description is provided in the context of the integrated sensing unit 30, it can be applied to sensing units 32-36 as well.

Pressure sensor 50 measures tire pressure and generates readings that can be processed, saved, analyzed, and/or transmitted by the integrated sensing unit 30. The pressure sensor 50 is preferably of the type that is in direct communication with the air inside of the tires (a so-called direct TPM system). Direct TPM systems calculate pressure changes based on actual measurements through physical pressure sensors installed on the wheel rims inside of each tire or as part of the valve stem, which is distinguishable from indirect TPM systems that measure tire pressure indirectly, typically through wheel speed measurements. If the indirect TPM system is mounted on the wheel itself such that it rotates with the tire, which is rather uncommon, it may be used for the integrated sensing unit 30. In the case of a direct TPM system, a variety of suitable mounting configurations could be used. These include mounting the pressure sensor 50 at the end of a valve stem, such as valve stem 40 shown schematically in FIG. 2, or mounting it in a steel band that extends around the rim of the wheel, to name a few. In one embodiment, the pressure sensor 50 may be made in a glass-silicon-glass structure that holds a pressure sensitive membrane with one or more piezo resistive elements buried therein. An absolute pressure reference can be given by a vacuum chamber implemented in the top glass, for example. The pressure sensor 50 is not limited to any particular type, and may be a MEMS capacitive sensor, an inductive sensor, or any other suitable sensor type.

IMU 52 measures rotational wheel speed and generates readings that can be processed, saved, analyzed, and/or transmitted by the integrated sensing unit 30. Any suitable type of IMU may be used, including, for example, a micro or MEMS-based IMU. The IMU may include one or more gyroscopes for measuring angular rate, one or more accelerometers for measuring acceleration, or a combination of both. In one embodiment, the IMU includes at least three accelerometers. In a preferred embodiment, the IMU is a multi-axis IMU that provides data regarding movement about and/or along 3 or more axes, and preferably 6 axes. The multi-axis IMU may include one or more accelerometers and one or more gyroscopes. The "rotational wheel speed reading" from the IMU may include a speed, velocity, or acceleration reading that is measured or otherwise derived from various speed and/or acceleration readings. Depending on the particular mounting arrangement, the rotational wheel speed readings from the IMU may be in the form of an angular rate about the x-, y-, or z-axis (pitch rate, roll rate, and/or yaw rate, respectively). As shown in FIG. 1, the integrated sensing unit 30, and accordingly the IMU 52, may be mounted such that rotation about the x-axis of the IMU corresponds to the rotation of the wheel 12 about the wheel's axle 92, thereby providing an IMU pitch rate as the rotational wheel speed reading. Due to high forces in the wheel, a safe and secure installation of the integrated sensing unit 30, which includes the pressure sensor 50 and the IMU 52, is preferred. Thus, the integrated sensing unit 30 can be combined or packaged with the valve stem 40 to create an integrated sensing and valve stem assembly or, alternatively, the integrated sensing unit 30 could be incorporated as a component of the rim.

Sensor circuitry 54 receives input from the pressure sensor 50 and the IMU 52 and is able to wirelessly communicate with transceiver unit 38, which is stationarily located on vehicle 20. Communication with the transceiver unit 38 or, more simply, an RF receiver, can be one-way or two-way. According to the particular embodiment shown here, sensor circuitry 54 is electronically connected to the sensors 50, 52 and antenna 56 and includes a processing unit 60, a wireless unit 62, and memory 64. While it is schematically shown that the pressure sensor 50 and the IMU 52 use a common sensor circuitry 54, it is also possible to have independent, distinct signal conditioning or processing circuitry for one or more sensors included as a part of the integrated sensing unit. Also, integrated sensing unit 30 is not limited to tire pressure and wheel speed sensors only, and may include any number of other suitable sensing elements, such as temperature sensors and the like.

Processing unit 60 can process information from a number of different sources and preferably includes one or more suitable components, such as a microprocessor, a microcontroller, an application specific integrated circuit (ASIC), or any other suitable electronic processing device known in the art. Processing unit 60 may be assigned a variety of tasks, including processing or interpreting sensor readings from the pressure sensor 50 and the IMU 52, as well as packaging or converting the sensor readings into a suitable data format or wireless message that can be provided to wireless unit 62 for subsequent wireless transmission. Alternatively, the sensor readings from the pressure sensor 50 and the IMU 52 may be packaged and transmitted separately. If sensor circuitry 54 is being used in a receiving capacity, processing unit 60 may be used to process and interpret incoming messages and instructions from transceiver unit 38 or another transmitter or vehicle module. These are only some of the tasks and functions that processing unit 60 may perform, as skilled artisans will appreciate that it could be used in many other capacities as well.

Wireless unit 62 may perform a number of tasks pertaining to the transmission and/or reception of wireless signals between the wheel-based integrated sensing unit 30 and the vehicle-based transceiver unit 38. In an exemplary embodiment, wireless unit 62 participates in the transmission and reception of radio frequency (RF) signals. Modulation/ demodulation, data encoding/decoding and error correction schemes, carrier frequency, radio frequency, signal transmission level, signal transmission rate, or any other appropriate wireless setting will depend on the requisites of the particular integrated sensing system that is desired. For example, when driving (i.e., the vehicle wheels are rotating), each integrated sensing unit 30-36 can transmit pressure sensor readings and IMU readings, or a combined wireless message with both pressure and IMU readings via the RF link. During parking and stand still, the transmission intervals may be increased in order to conserve power.

Memory 64 may store various pieces of data, information, algorithms, wireless settings, software, firmware, etc., and can be accessed by the different components of the integrated sensing system 10. In one example, memory 64 stores readings taken by the pressure sensor 50 and the IMU 52, electronic instructions used to control processing unit 60, and/or information pertaining to the various wireless settings that are available for selection. These are, of course, only some of the items that could be stored at memory 64, as skilled artisans will know of many other potential uses.

Antenna 56 is electronically coupled to sensor circuitry 54, particularly with wireless unit 62, and aids in the transmission and reception of wireless signals. In one exemplary embodiment, antenna 56 is an RF antenna and is integrated into a valve stem that functions as both an air valve for the tire and as an antenna for transmitting and receiving encoded RF information pertaining to the pressure sensor 50 and the IMU 52. Depending on where the vehicle is likely to be used, antenna 54 may transmit and receive signals over the Industrial Scientific Medical (ISM) frequency bands (e.g., in Europe 434 MHz/868 MHz and in the USA and Japan 315 MHz/915 MHz). Other embodiments of antenna 56 could also be used, and any suitable form of wireless transmission may be used (e.g., Bluetooth, 4G LTE, etc.).

Power source 58 powers the components of the integrated sensing unit 30 and may include any suitable power source known in the art. In an exemplary embodiment, power source 58 includes a non-replaceable lithium-ion battery with an expected lifetime of around ten years. Because of the finite lifetime of such a power source, efforts should be made to save battery consumption and prolong its life. In another embodiment, power source 58 is a passive device that derives its energy from wireless transmissions sent to the sensor unit; energy associated with the wireless transmissions is harnessed and stored by power source 58. The preceding examples are only two exemplary possibilities that could be used, as others are certainly possible.

Transceiver unit 38 is located on vehicle 20 as part of a control module 70 and may be electronically connected to any number of different vehicle electronic modules, such as a safety control module 72 or a brake control module 74 which may control active safety systems and anti-lock brake systems, respectively. In a preferred embodiment, control module 70 is a body control module. It should be noted that these modules are merely exemplary, and more or different modules or control units may be included. The transceiver unit 38 is wirelessly connected to the integrated sensing units 30-36, and according to an exemplary embodiment, transceiver unit 38 includes an RF transceiver and signal processing resources for communicating with sensing units 30-36 over a low power, two-way wireless link. Other wireless communication techniques could also be used to facilitate wireless communication between these components. Transceiver unit 38 may be integrated or combined with another device or module in the vehicle, such as an anti-lock brake control module or a body control module, it may be a stand-alone module, or it may be implemented according to some other arrangement known in the art, for example. The transceiver may also be used for remote keyless entry (RKE) and vehicle theft deterrent (VTD) systems that operate in or around the same frequency bands. It should be appreciated that transceiver unit 38 may include any combination of electronic components and devices known in the art, including an antenna 78, an exemplary communications circuitry 80 having a processing unit 82, a wireless unit 84, and memory 86. Components 82-86 could be similar to those described in conjunction with the integrated sensor unit 30, or they could be different in order to accommodate the greater needs of a more sophisticated vehicle-mounted module. Transceiver unit 38 may also have an I/O device 88 for connecting the transceiver unit to a vehicle bus 90 or other vehicle communications network, as well as other components like filters, demodulators, oscillators, etc. While the integrated sensing system 10 includes a transceiver capable of both transmitting and receiving signals, it may be possible to replace the transceiver unit 38 with an RF receiver.

Figure 2:
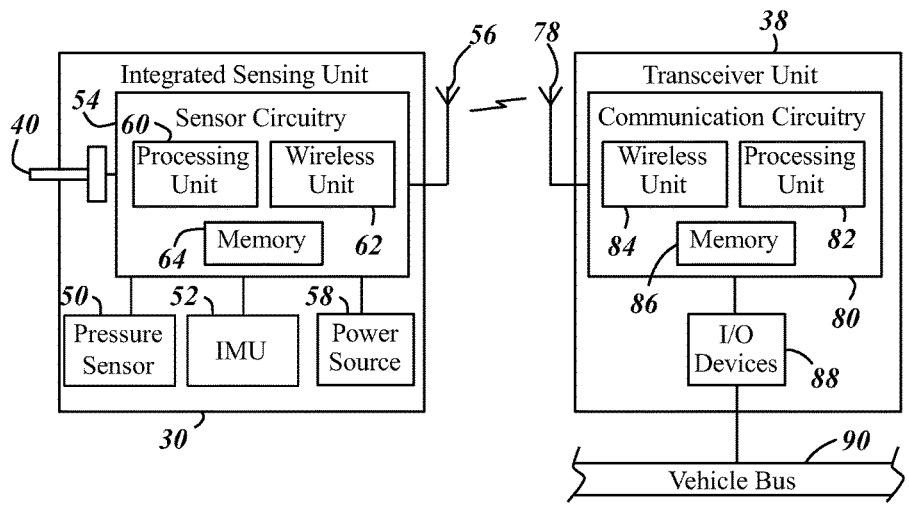
FIG. 2 is a more detailed schematic view of the integrated sensing system of FIG. 1 where, for purposes of illustration, only a single integrated sensing unit and the transceiver unit are shown.

It should be appreciated that the general operation of a TPM system is known in the art, and shares many features of the integrated sensing system 10. Thus, a recitation of the known general operation is not provided here. The integrated sensing system 10 may be used with any number of wheel-mounted integrated sensing units 30-36, and is not limited to use with four sensor units only. For instance, the integrated sensing system could interact with one, two or three sensing units, or it could interact with more than four sensing units, such as the case of a vehicle with more than four wheels (e.g., a tractor trailer or the like) or a vehicle with more than one integrated sensing unit per wheel. It should further be understood that the integrated sensing units 30-36 can include other components or sensors, such as a temperature sensor, a linear accelerometer, an analog-to-digital converter (ADC), or other components known in the art. Moreover, while the term "integrated" is used to describe the sensing units 30-36, it is not required that the various components all be included or packaged within a common housing. As a particular example, an IMU could be mounted on the vehicle wheel well in a location other than the valve stem, yet still take advantage of the sensor circuitry or antenna of a TPM system that is part of the valve stem. The preceding description of exemplary sensing system 10 and the drawing in FIGS. 1 and 2 are only intended to illustrate one potential embodiment, as the following method is not confined to use with only that system. Any number of other system arrangements, combinations, and architectures, including those that differ significantly from the one shown in FIGS. 1 and 2, may be used instead.

Figure 3:
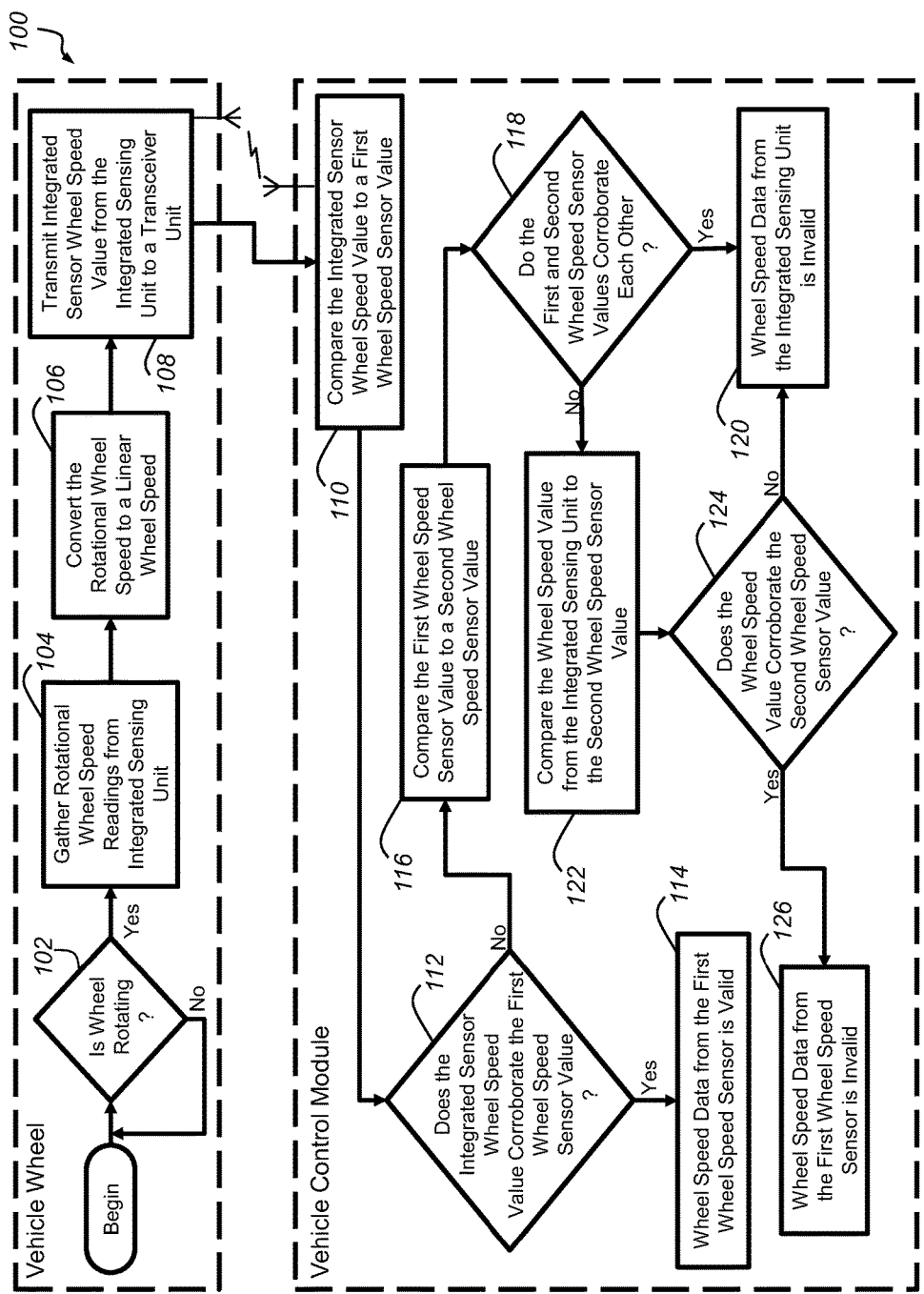
FIG. 3 is a flowchart illustrating some of the steps of an exemplary method for operating an integrated sensing system, such as the integrated sensing system depicted in FIGS. 1 and 2.

Turning to FIG. 3, there is shown an exemplary method 100 that may be used with the integrated sensing system 10 in order to determine wheel speed and in one embodiment, diagnose errors of other wheel speed sensors. By adding redundancy to the overall wheel speed sensing system, the integrated sensing system 10 and method described herein can prolong the availability of certain systems in the event of a wheel speed sensor failure, such as traction control systems or other active safety systems, which rely on the integrity of the wheel speed sensors.

Beginning with step 102, the method asks whether the wheel is rotating. When the wheel is rotating, it is possible for the integrated sensing unit 30 to sense rotational motion, which can ultimately be used to calculate a linear wheel speed value. Information as to whether the wheel is rotating may come from the IMU 52 itself, or it may be transmitted wirelessly through the transceiver unit 38, to cite a few possibilities. Step 102 may be unnecessary in some instances, because the method 100 may be initiated or started in response to any number of different events and can be executed on a periodic, aperiodic, and/or other basis, as the method is not limited to any particular initialization sequence. However, by waiting to initiate the method until the wheel is rotating, power from the power source 58 can be conserved because the system 10 is not using power to obtain, process and/or transmit nominal wheel speed values.

In step 104, the method gathers rotational wheel speed readings from the IMU 52 of the integrated sensing unit 30. Depending on the type of IMU that is used, the rotational wheel speed readings will typically be in the form of an angular rate or acceleration. As described before, depending on the particular mounting arrangement, the rotational wheel speed from the IMU may be in the form of an angular rate about the x-, y-, or z-axis (pitch rate, roll rate, and/or yaw rate, respectively); or the rotational wheel speed reading from the IMU may be provided or derived from various speed and/or acceleration measurements. The processing unit 60 of the integrated sensing unit 30 or the IMU 52 itself may encode the rotational wheel speed readings with information such as the time at which the reading was obtained.

Step 106 is optional and involves converting the rotational wheel speed gathered in step 104 to a linear wheel speed, because most systems and modules use linear wheel speed as an input instead of rotational wheel speed. This step may be accomplished using the processing unit 60 of the sensor circuitry 54. However, it is also possible for this step to be accomplished later in the method at the vehicle 20 by the control module 70 or another control module, as control module 70 will likely have greater processing resources than the integrated sensing unit 30. Skilled artisans will appreciate the relationship between rotational wheel speed and linear wheel speed, and that the conversion between the two could take into account the radius of the tire, the radius of the wheel rim, or other relevant dimensions. In one embodiment, if v represents the linear speed of a rotating wheel, r represents the relevant radius, and ω represents the angular velocity of the rotating wheel in units of radians per unit of time, then $$v = r\omega$$

It may also be possible to store a look-up table in memory 64 or in a different module that includes rotational wheel speed values and the corresponding linear wheel speed values for a given radius. Other methods for conversion are certainly possible, and may not even be necessary if a particular system or module uses rotational wheel speed as an input.

In step 108, the integrated sensor wheel speed value from the integrated sensing unit 30 is transmitted to the transceiver unit 38. The "integrated sensor wheel speed value" may be a rotational wheel speed obtained directly from the rotational wheel speed readings provided by IMU 52, or it may be a linear wheel speed, depending upon when and/or if step 106 is performed. For example, a rotational wheel speed value may be transmitted to the control module 70 in the vehicle 20 which then converts the rotational wheel speed value to a linear wheel speed value to be used as the integrated sensor wheel speed value in remaining steps of the method. In a preferred embodiment, the integrated sensor wheel speed value is transmitted wirelessly to the transceiver unit 38. The integrated sensor wheel speed value may be transmitted in its own data packet separate from other sensor readings, or it may be combined with pressure sensor readings from the pressure sensor 50 such that a tire pressure value and an integrated sensor wheel speed value are sent to the transceiver unit 38 of the control module 70 in one wireless message that is subsequently decoded. In another embodiment, the integrated sensor wheel speed value is transmitted to a different transceiver than the pressure value. The particular coding scheme can vary depending on factors such as transmission intervals, power conservation goals, and the number of operational wheel speed sensors, to cite a few examples. Typically the transmission rate for pressure readings is much less than the transmission rate for wheel speed sensor readings. Preferably, the wheel speed transmission rate is once every 10-20 msec. Accordingly, because the sampling rate is typically slower for tire pressure, the method may wirelessly report a plurality of messages containing integrated sensor wheel speed values in between messages containing tire pressure values.

Steps 110-126 of the method 100 involve a diagnostic example of how data from the integrated sensing system 10 may be used by one or more control modules 70-74 of the vehicle 20. Unlike steps 102 through 108 which are generally performed by the sensor circuitry 52 located at the wheel 12, steps 110-126 are typically executed by one or more control modules located in the body of the vehicle 20. Generally, for safety critical systems, if two pieces of data are different but they should be the same, then both pieces of data are discarded and some form of remedial action is triggered, such as shutting the feature down. For the purposes of availability and redundancy, generally three or more pieces of data, as described in steps 110-126 below, are analyzed to identify which specific sensor is malfunctioning while continuing to operate the system with the remaining two functioning sensors. Thus, the present system and method can assist in making existing wheel speed sensor systems more fault-tolerant without sacrificing safety.

Step 110 is an initial diagnostic check that compares the integrated sensor wheel speed value from the integrated sensing unit 30 to a first wheel speed sensor value. In a preferred embodiment, the first wheel speed sensor value is a wheel speed measurement from the same wheel as the integrated sensing unit, which in this example, would be the wheel speed measurement from the wheel speed sensor 22 at the wheel 12 (e.g., intrawheel corroboration), as depicted in FIG. 1. Typically, the first wheel speed sensor 22 is stationarily mounted at or near the vehicle wheel 12. However, it should be understood that the first wheel speed sensor value could be from any of the wheel speed sensors 22-28 or another integrated sensing unit 32-36 (e.g., interwheel corroboration). It is also preferable if both speed values were obtained at approximately the same time.

Step 112 involves intrawheel corroboration, asking whether the wheel speed value of the integrated sensing unit 30 corroborates the first wheel speed sensor value, which in this example, is the wheel speed sensor 22 that is stationarily mounted at or near the vehicle wheel 12. The redundant wheel speed value provided by the integrated sensing unit 30 allows for a more precise and reliable intrawheel corroboration of the data provided by the wheel speed sensor 22. This redundancy, as described in more detail below, can provide for increased availability of features and systems that rely upon an accurate determination of wheel speed, including anti-lock brake (ABS) systems, active safety systems, electronic stability programs (ESP), trailer-sway control (TSC) systems, and active cruise control (ACC) systems, among others.

If in step 112 the integrated sensor wheel speed value matches, or at least comes within some threshold of the first wheel speed sensor value, then in step 114, it can be determined that the wheel speed data from the first wheel speed sensor 22 is valid. In one embodiment, the threshold is an error-based, speed dependent threshold. In a specific example, the speed dependent threshold is a 10% error rate. For example, a 10% error at 5 mph would indicate that a difference of 0.5 mph or more would be unacceptable. Similarly, a 10% error at 100 mph would indicate that a difference of 10 mph or more would be unacceptable. The threshold may be adjusted such that there is a smaller error percentage at higher speeds or higher speed ranges. The threshold may be different depending on whether the method is performing intra- or interwheel corroboration, which is described in more detail below. For example, the threshold may be higher for interwheel corroboration than for intra-wheel corroboration.

If in step 112 the wheel speed value from the integrated sensing unit 30 does not match, or is beyond some first wheel speed sensor value threshold, then the method continues to step 116 which attempts to verify the validity of the first wheel speed sensor. In particular, step 116 involves interwheel corroboration, comparing the first wheel speed sensor value to a second wheel speed sensor value. The second wheel speed value could come from any other sensor, including but not limited to one of the integrated sensing units 32-36 or the wheel speed sensors 24-28. It is preferable if the second wheel speed value is obtained at or near the same time as the integrated sensor wheel speed value and the first wheel speed sensor value from the first wheel speed sensor 22. Also, it may be preferable to compare sensor data from similar wheel types, e.g., comparing both drive wheels or comparing wheels on the same side of the vehicle. Accordingly, if vehicle 20 is a front-wheel drive vehicle, for example, it may be desirable to use readings from wheel speed sensor 24 as the second wheel speed sensor value. In an alternate embodiment, interwheel corroboration may involve comparing the first wheel speed sensor value to an average of two or more other sensor values, including output from other wheel speed sensors or other integrated sensing units.

Step 118 asks whether the first and second wheel speed sensor values corroborate each other (e.g., interwheel corroboration). In this particular example, the first wheel speed sensor reading comes from wheel speed sensor 22 while the second wheel speed sensor reading comes from wheel speed sensor 24. If the first and second wheel speed sensor values match or come within some pre-determined threshold of each other, as described with reference to step 112, then the method moves to step 120 where it is determined that the wheel speed data from the integrated sensing unit 30 is invalid. If the wheel speed data from the integrated sensing unit 30 is invalid, certain remedial actions may be triggered, such as alerting the driver that there is a sensor malfunction or disregarding wheel speed data from the integrated sensing unit 30 while solely relying upon wheel speed information from the wheel speed sensor 22. It should be noted that because there is still a valid wheel speed input for the wheel 12, there may be no need to disable system functionality, such as within the anti-lock brake (ABS) system, the active safety system, or the active cruise control (ACC) system, to cite a few examples.

In step 118, if it is determined that the first and second wheel speed sensor values do not corroborate each other, then the method continues onto step 122. At this point, because the integrated sensor wheel speed value does not corroborate the first wheel speed sensor value and the first wheel speed sensor value does not corroborate a second wheel speed sensor value, there is still a discrepancy as to whether there is a potential malfunction with the first wheel speed sensor 22 or the integrated sensing unit 30. To discern whether there is a malfunction with the first wheel speed sensor 22 or the integrated sensing unit 30, step 122 compares the wheel speed value from the integrated sensing unit 30 with the second wheel speed sensor value, which in this example, comes from the wheel speed sensor 24.

Step 124, involves a second interwheel corroboration, asking whether the wheel speed value from the integrated sensing unit 30 corroborates the second wheel speed sensor value, which in this example, is the wheel speed sensor 24. If the integrated sensor wheel speed value matches, or at least comes within some threshold of the second wheel speed sensor value, as described with relation to step 112, then the method moves to step 126 to diagnose the first wheel speed sensor 22. Because the integrated sensor wheel speed value from the integrated sensing unit 30 is corroborated by the second wheel speed sensor value from the second wheel speed sensor 24, it can be determined that the wheel speed data from the integrated sensing unit 30 is valid and wheel speed data from the first wheel speed sensor is invalid (step 126). It should be understood that, like the first interwheel corroboration, the second interwheel corroboration may instead compare the integrated sensor wheel speed value from the integrated sensing unit 30 with an average or some other combination of two or more readings from wheel speed sensors 22-28 or the integrated sensing units 32-36.

If it is determined in step 124 that the integrated sensor wheel speed value corroborates the second wheel speed sensor value such that wheel speed data from the first wheel speed sensor is invalid (step 126), then there is likely a malfunction with the first wheel speed sensor. In response, certain remedial actions may be triggered, such as alerting the driver that there is a sensor malfunction or disregarding wheel speed data from the first wheel speed sensor 22 while solely relying upon wheel speed information from the integrated sensing unit 30. As described above, it should be noted that because there is still a valid wheel speed input for the wheel 12, there may be no need to disable system functionality, such as within the anti-lock brake (ABS) system, the active safety system, or the active cruise control (ACC) system, to cite a few examples. The added redundancy can result in a more robust wheel speed sensing system.

In step 124, if it is determined that the wheel speed value from the integrated sensing unit 30 does not corroborate the second wheel speed sensor value from the wheel speed sensor 24, then the method returns to step 120 where it is determined that the wheel speed data from the integrated sensing unit 30 is invalid. At this point, the integrated sensing unit output and the first wheel speed sensor output do not match (step 112), the first and second wheel speed sensor outputs do not match (step 118), and the integrated sensing unit output and the second wheel speed sensor output do not match (step 124). More extensive remedial action may need to be taken in such a scenario, or more redundancy checks could be performed. For example, the method may continue to check each speed sensor value against the other wheel speed sensors 26, 28 or the other integrated sensing units 32-36 (e.g., additional interwheel corroboration). Alternatively, the system could be designed to disable certain safety features that rely upon an accurate measure of wheel speed, since there may be a problem with both the first wheel speed sensor 22 and the integrated sensing unit 30. Other alternative courses of action will be apparent to those having ordinary skill in the art.

It should again be emphasized that the diagnostic example provided in steps 110-126 above could be alternatively organized and/or executed. Further, more or different comparisons could be made between the various wheel speed sensors in order to enhance system credibility. The increased redundancy provided by including one or more integrated sensing units results in a greater availability of vehicle systems while minimizing costs by exploiting pre-existing hardware that is part of the TPM system.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for determining vehicle wheel speed with an integrated sensing unit, wherein the integrated sensing unit is mounted on the vehicle wheel and includes a pressure sensor, an inertial measurement unit (IMU), a processor, and an antenna, the method comprising the steps of:
gathering pressure sensor readings from the pressure sensor, wherein the pressure sensor readings indicate a tire pressure value;
gathering rotational wheel speed readings from the IMU of the integrated sensing unit;
using one or more rotational wheel speed readings gathered from the IMU of the integrated sensing unit to determine an integrated sensor wheel speed value;
after determining the integrated sensor wheel speed value, wirelessly transmitting the integrated sensor wheel speed value to a control module via the antenna of the integrated sensing unit; and
wirelessly transmitting the tire pressure value to a control module via the antenna of the integrated sensing unit, wherein the transmission rate for wirelessly transmitting the tire pressure value is less than the transmission rate for wirelessly transmitting the integrated sensor wheel speed value.

2. The method of claim 1, wherein a plurality of wireless messages containing integrated sensor wheel speed values are transmitted to the control module between wireless messages containing tire pressure values.

3. The method of claim 1, wherein the processor of the integrated sensing unit converts one or more rotational wheel speed readings to a linear wheel speed value such that the integrated sensor wheel speed value is the linear wheel speed value.

4. The method of claim 1, further comprising the steps of comparing the integrated sensor wheel speed value to a first wheel speed sensor value from a stationary wheel speed sensor, and if the integrated sensor wheel speed value corroborates the first wheel speed sensor value, then determining that wheel speed data from the stationary wheel speed sensor is valid.

5. The method of claim 4, further comprising the step of comparing the first wheel speed sensor value to a second wheel speed sensor value if the first wheel speed sensor value does not corroborate the integrated sensor wheel speed value, and if the first and second wheel speed sensor values corroborate each other, then determining that wheel speed data from the integrated sensing unit is invalid.

6. The method of claim 5, further comprising the step of comparing the integrated sensor wheel speed value to the second wheel speed sensor value if the first and second wheel speed sensor values do not corroborate each other, and if the second wheel speed sensor value corroborates the integrated sensor wheel speed value, then determining that wheel speed data from the first wheel speed sensor is invalid.

7. The method of claim 6, further comprising the steps of disregarding wheel speed data from the first wheel speed sensor and using integrated sensor wheel speed data to preserve the availability of systems that use wheel speed data.

8. The method of claim 1, wherein the IMU is a multi-axis inertial measurement unit (multi-axis IMU) comprising one or more accelerometers and one or more gyroscopes.

9. The method of claim 1, wherein the one or more rotational wheel speed readings from the IMU are in the form of an angular rate about the x-, y-, or z-axis of the IMU depending on the mounting arrangement of the integrated sensing unit.

10. The method of claim 9, wherein the integrated sensing unit is mounted on a valve stem of the vehicle wheel such that rotation about the x-axis of the IMU corresponds to the axis of rotation of the wheel about an axle of the wheel, thereby providing an IMU pitch rate as the rotational wheel speed reading.

11. A method of corroborating wheel speed data from one or more vehicle wheel speed sensors with an integrated sensing unit, wherein the integrated sensing unit is mounted on the vehicle wheel and includes a pressure sensor, an inertial measurement unit (IMU), a processor, and an antenna, the method comprising the steps of:
gathering rotational wheel speed readings from the IMU of the integrated sensing unit;
using one or more rotational wheel speed readings gathered from the IMU of the integrated sensing unit to determine an integrated sensor wheel speed value;
gathering a first wheel speed sensor value from a first wheel speed sensor that is stationary and is configured to collect data relating to the vehicle wheel; and
performing intrawheel corroboration with the integrated sensing unit that rotates in the vehicle wheel, wherein intrawheel corroboration verifies the validity of wheel speed data from the first wheel speed sensor that is stationary through a comparison of the first wheel speed sensor value to the integrated sensor wheel speed value.

12. The method of claim 11, wherein if the integrated sensor wheel speed value corroborates the first wheel speed sensor value, then determining that wheel speed data from the first wheel speed sensor is valid.

13. The method of claim 12, wherein the integrated sensor wheel speed value and the first wheel speed sensor value are compared using an error-based, speed dependent threshold.

14. The method of claim 11, further including the step of performing interwheel corroboration to verify the validity of the wheel speed data from the first wheel speed sensor, wherein interwheel corroboration includes comparing the first wheel speed sensor value to an average of two or more wheel speed values from another vehicle wheel speed sensor or another integrated sensing unit.

15. A method of corroborating wheel speed data from one or more vehicle wheel speed sensors with an integrated sensing unit, wherein the integrated sensing unit is mounted on the vehicle wheel and includes a pressure sensor, an inertial measurement unit (IMU), a processor, and an antenna, the method comprising the steps of:
gathering rotational wheel speed readings from the IMU of the integrated sensing unit;
using one or more rotational wheel speed readings gathered from the IMU of the integrated sensing unit to determine an integrated sensor wheel speed value;
performing intrawheel corroboration with the integrated sensing unit that rotates in the vehicle wheel, wherein intrawheel corroboration verifies the validity of wheel speed data from a first wheel speed sensor that is stationary; and
performing interwheel corroboration to verify the validity of the wheel speed data from the first wheel speed sensor, wherein interwheel corroboration includes comparing a first wheel speed sensor value to a second wheel speed sensor value from a second wheel speed sensor or a second integrated sensor value from a second integrated sensing unit, and if the validity of the first wheel speed sensor value is not verified by the intrawheel corroboration but is verified by the interwheel corroboration, then determining that wheel speed data from the integrated sensing unit is invalid.

16. The method of claim 15, wherein the first wheel speed sensor value and the second wheel speed sensor value or the second integrated sensor value are compared using an error-based, speed dependent threshold that is greater than an error-based, speed dependent threshold used for intrawheel corroboration.

17. An integrated sensing unit, comprising:
a valve stem;
an inertial measurement unit (IMU) for providing rotational wheel speed readings;
a pressure sensor for providing tire pressure sensor readings; and
sensor circuitry for the IMU and the pressure sensor including memory, a processing unit, and a wireless unit for transmitting the tire pressure sensor readings and integrated sensor wheel speed values to a control module of a vehicle, wherein the integrated sensing unit is mounted within a vehicle wheel and the integrated sensor wheel speed values are-obtained from one or more rotational wheel speed readings provided by the IMU, the IMU and the pressure sensor are packaged within a common housing, the sensor circuitry is configured to separately transmit the tire pressure sensor readings and the integrated sensor wheel speed values, and the transmission rate for wirelessly transmitting the tire pressure readings is less than the transmission rate for the integrated sensor wheel speed values.

* * * * *